(12) United States Patent
Kang et al.

(10) Patent No.: US 10,770,229 B2
(45) Date of Patent: Sep. 8, 2020

(54) DIELECTRIC COMPOSITION AND ELECTRONIC COMPONENT CONTAINING THE SAME

(71) Applicant: SAMSUNG ELECTRO-MECHANICS CO., LTD., Suwon-Si, Gyeonggi-Do (KR)

(72) Inventors: Sung Hyung Kang, Suwon-Si (KR); Hyung Kyu Kim, Suwon-Si (KR); Jong Hyun Cho, Suwon-Si (KR); Du Won Choi, Suwon-Si (KR); Yong Koo Kim, Suwon-Si (KR); Hang Kyu Cho, Suwon-Si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 16/115,049

(22) Filed: Aug. 28, 2018

(65) Prior Publication Data
US 2019/0304686 A1  Oct. 3, 2019

(30) Foreign Application Priority Data
Mar. 28, 2018  (KR) .................. 10-2018-0035868

(51) Int. Cl.
*H01G 4/30* (2006.01)
*H01G 4/12* (2006.01)
(Continued)

(52) U.S. Cl.
CPC ....... *H01G 4/1227* (2013.01); *C04B 35/4682* (2013.01); *H01G 4/008* (2013.01); *H01G 4/30* (2013.01); *C04B 2235/3236* (2013.01)

(58) Field of Classification Search
CPC ........ H01G 4/1227; H01G 4/30; H01G 4/008; C04B 35/4682; C04B 2235/3236
See application file for complete search history.

(56) References Cited

U.S. PATENT DOCUMENTS 7,796,373 B2 * 9/2010 Sasabayashi ....... C04B 35/4682
29/25.42
2008/0112109 A1  5/2008 Muto et al.
(Continued)

FOREIGN PATENT DOCUMENTS

KR       10-0906079 B1   7/2009
KR    10-2009-0105972 A  10/2009
(Continued)

*Primary Examiner* — Noah S Wiese
(74) *Attorney, Agent, or Firm* — Morgan, Lewis & Bockius LLP

(57) ABSTRACT

A dielectric composition contains: a base material powder containing $Ba_mTiO_3$ (0.995≤m≤1.010); a first accessory ingredient containing at least one element corresponding to a transition metal in Group 5 of the periodic table in a total content of 0.3 to 1.2 moles; a second accessory ingredient containing one of ions, oxides, carbides, and hydrates of Si in a content of 0.6 to 4.5 moles; a third accessory ingredient containing at least one element in Period 4 or higher; and a fourth accessory ingredient containing at least one element in Period 3, wherein 0.70×B≤C+D≤1.50×B and 0.20≤D/(C+D)≤0.80, in which B is a total content of the second accessory ingredient, C is a total content of the third accessory ingredient, and D is a total content of the fourth accessory ingredient.

20 Claims, 3 Drawing Sheets

(51) Int. Cl.
*C04B 35/468* (2006.01)
*H01G 4/008* (2006.01)

(56) References Cited

U.S. PATENT DOCUMENTS

| | | | |
|---|---|---|---|
| 2009/0310279 A1 | 12/2009 | Sasabayashi et al. | |
| 2013/0194718 A1* | 8/2013 | Matsuda | H01G 4/1227 361/301.4 |
| 2015/0036264 A1* | 2/2015 | Morita | C04B 35/4682 361/321.4 |
| 2016/0155570 A1* | 6/2016 | Shimada | H01G 4/1227 361/301.4 |

FOREIGN PATENT DOCUMENTS

| | | |
|---|---|---|
| KR | 10-2013-0062343 A | 6/2013 |
| KR | 10-2016-0065012 A | 6/2016 |
| KR | 10-1646913 B1 | 8/2016 |

* cited by examiner

US 10,770,229 B2

DIELECTRIC COMPOSITION AND ELECTRONIC COMPONENT CONTAINING THE SAME

CROSS-REFERENCE TO RELATED APPLICATION(S)

This application claims the benefit of priority to Korean Patent Application No. 10-2018-0035868 filed on Mar. 28, 2018 in the Korean Intellectual Property Office, the disclosure of which is incorporated herein by reference in its entirety.

BACKGROUND

1. Field

The present disclosure relates to a dielectric composition and an electronic component containing the same.

2. Description of Related Art

In a high-capacitance multilayer ceramic capacitor (MLCC), $BaTiO_3$ is used as a main ingredient and nickel is used as a base material of internal electrodes, thereby forming a body.

The body as described above should be sintered under a reduction atmosphere, and a dielectric material should have reduction resistance.

However, there may be a problem, in that as oxygen vacancy and electrons are generated due to the release of oxygen in oxides at the time of sintering under the reduction atmosphere, reliability may be deteriorated and insulator resistance (IR) may be decreased.

In order to solve this problem, a method of adding a rare earth element, for example, Dy, Y, Ho, and the like, to suppress the generation of an oxygen vacancy and decrease mobility of the oxygen vacancy, and adding a transition metal to suppress generation of the electrons to thereby exhibit dielectric characteristics has been used.

However, in a case of thinning a dielectric layer of the multilayer ceramic capacitor in order to have higher capacitance or a voltage is increased as the multilayer capacitor has been used under severe conditions, the above-mentioned method is ineffective.

Further, in a case of adding the rare earth element or the transition element to the dielectric material by the above-mentioned method, permittivity may be deteriorated, and temperature coefficient of capacitance (TCC) characteristics may be deteriorated in some cases, such that the dielectric material may not be used for X7R characteristics.

SUMMARY

An aspect of the present disclosure may provide a dielectric composition having excellent high-temperature reliability and TCC characteristics, and an electronic component containing the same.

According to an aspect of the present disclosure, a dielectric composition may contain: a base material powder containing $Ba_mTiO_3$ ($0.995 \leq m \leq 1.010$); a first accessory ingredient containing at least one element corresponding to a transition metal in Group 5 of the periodic table, based on 100 moles of the base material powder; a second accessory ingredient containing ions or oxides of Si in a content of 0.6 to 4.5 moles, based on 100 moles of the base material powder; a third accessory ingredient containing at least one element in Period 4 higher; and a fourth accessory ingredient containing at least one element in Period 3, wherein $0.70 \times B \leq C+D \leq 1.50 \times B$ and $0.20 \leq D/(C+D) \leq 0.80$, in which B is a total content of the second accessory ingredient, C is a total content of the third accessory ingredient, and D is a total content of the fourth accessory ingredient.

The first accessory ingredient may contain ions or oxides of at least one selected from the group consisting of V, Nb, and Ta.

The third accessory ingredient may contain ions or oxides of at least one selected from the group consisting of Ca, Sr, and Ba.

The fourth accessory ingredient may contain Mg.

The dielectric composition may further contain a fifth accessory ingredient containing ions or oxides of at least one selected from the group consisting of Mn, Cr, Fe, and Co in a content of 0.1 to 1.0 mole based on 100 moles of the base material powder.

The dielectric composition may further contain a sixth accessory ingredient containing ions or oxides of at least one selected from the group consisting of Y, Sm, Eu, Dy, Ho, Er, and Yb in a content of 0.2 to 4.0 moles, based on 100 moles of the base material powder.

The dielectric composition may further contain an oxide of at least one of Li, K, B, and Al in a content of 0.1 to 0.5 moles, based on 100 moles of the base material powder.

According to another aspect of the present disclosure, an electronic component may include: a body including a plurality of dielectric layers and internal electrodes; and external electrodes disposed on the body to be connected to the internal electrodes, wherein the dielectric layer contains: a base material powder containing $Ba_mTiO_3$ ($0.995 \leq m \leq 1.010$); a first accessory ingredient containing at least one element corresponding to a transition metal in Group 5 of the periodic table, in a total content of 0.3 to 1.2 moles, based on 100 moles of the base material powder; a second accessory ingredient containing ions or oxides of Si in a content of 0.6 to 4.5 moles, based on 100 moles of the base material powder; a third accessory ingredient containing at least one element in Period 4 or higher; and a fourth accessory ingredient containing at least one element in Period 3, wherein $0.70 \times B \leq C+D \leq 1.50 \times B$ and $0.20 \leq D/(C+D) \leq 0.80$, in which B is a total content of the second accessory ingredient, C is a total content of the third accessory ingredient, and D is a total content of the fourth accessory ingredient.

The dielectric layer may have a thickness of 0.2 μm or more.

According to another aspect of the present disclosure, a dielectric composition may contain: a base material powder containing $Ba_mTiO_3$ ($0.995 \leq m \leq 1.010$); a first accessory ingredient containing at least one element corresponding to a transition metal in Group 5 of the periodic table, based on 100 moles of the base material powder; a second accessory ingredient containing ions or oxides of Si in a content of 0.6 to 4.5 moles, based on 100 moles of the base material powder; a third accessory ingredient containing at least one Group 2 element; and a fourth accessory ingredient containing at least one Group 2 element having a lower atomic number than the at least one Group 2 element contained in the third accessory ingredient, wherein $0.70 \times B \leq C+D \leq 1.50 \times B$ and $0.20 \leq D/(C+D) \leq 0.80$, in which B is a total content of the second accessory ingredient, C is a total content of the third accessory ingredient, and D is a total content of the fourth accessory ingredient.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

A dielectric composition according to the present disclosure may be used in a dielectric electronic component.

For example, the dielectric composition may be used in a multilayer ceramic capacitor, a piezoelectric device, an inductor, a varistor, a resistor, and the like.

Hereinafter, the multilayer ceramic capacitor will be described as an example of the dielectric electronic component.

Figure 1:
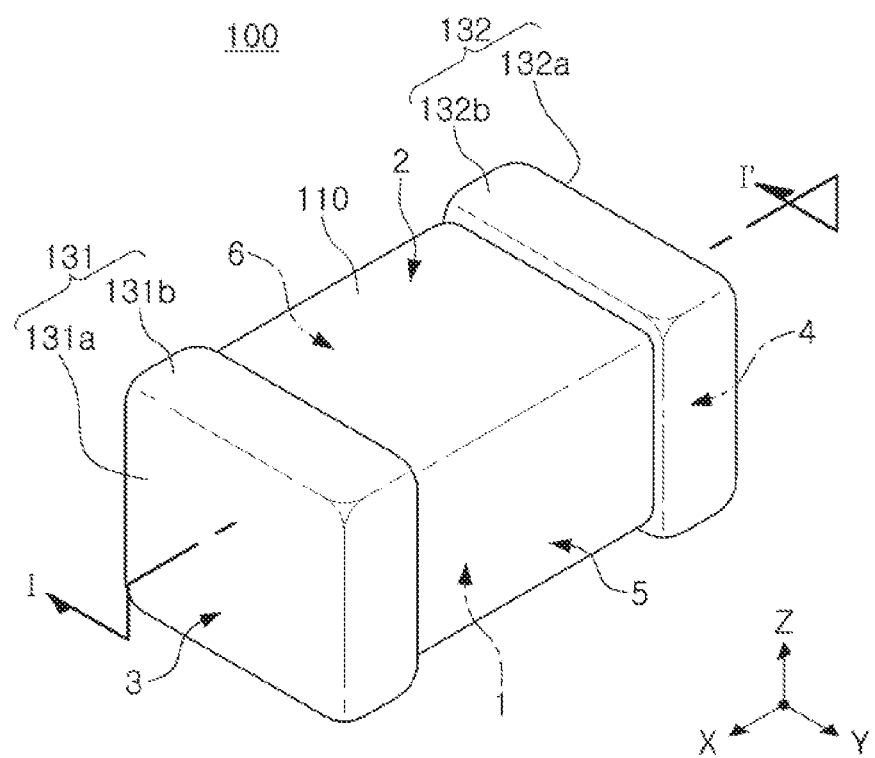
FIG. 1 is a perspective view schematically illustrating a multilayer ceramic capacitor according to an exemplary embodiment in the present disclosure.
Figure 2:
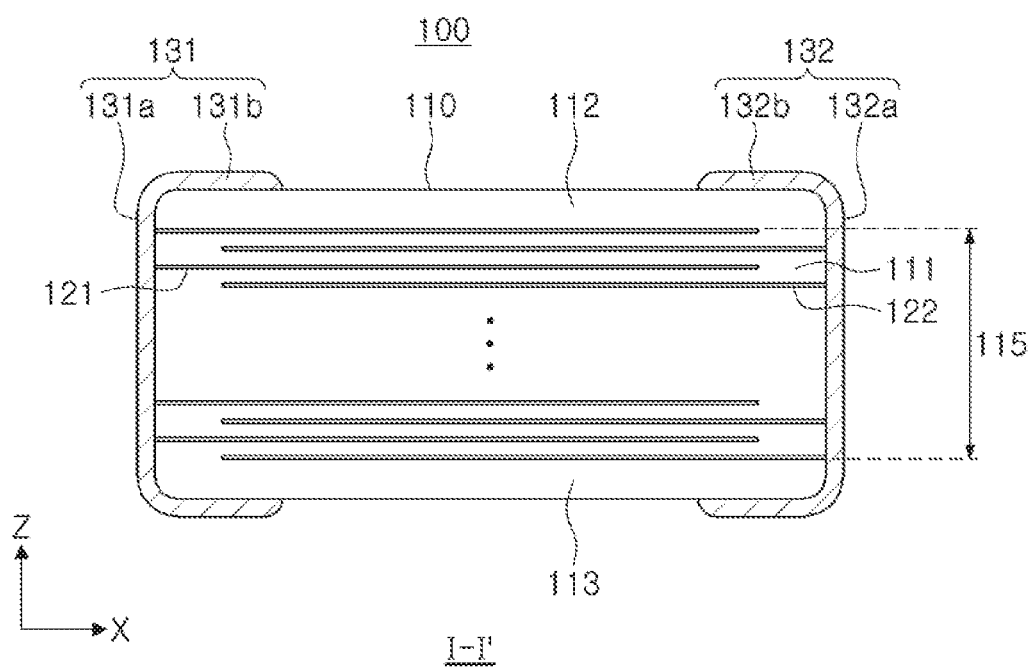
FIG. 2 is a cross-sectional view taken along line I-I' of FIG. 1.
Figure 3:
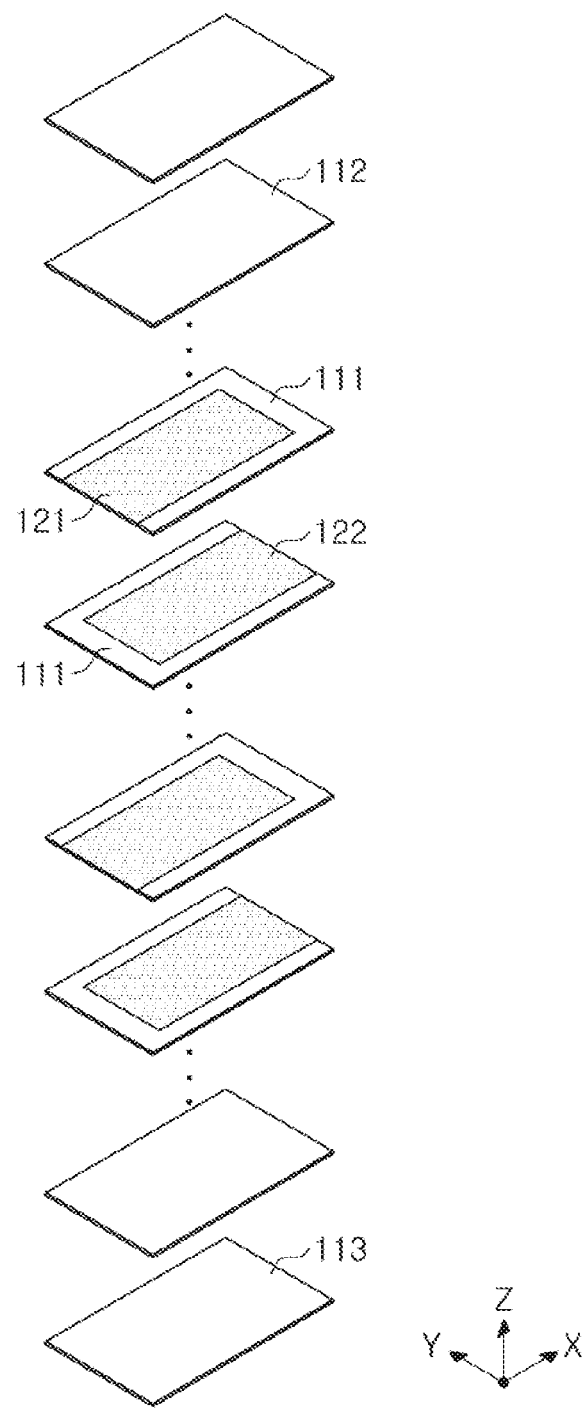
FIG. 3 is an exploded perspective view of a body of FIG. 1.

FIG. 1 is a perspective view schematically illustrating a multilayer ceramic capacitor according to an exemplary embodiment in the present disclosure, FIG. 2 is a cross-sectional view taken along line I-I' of FIG. 1, and FIG. 3 is an exploded perspective view of a body of FIG. 1.

Referring to FIGS. 1 through 3, an electronic component 100 according to the present exemplary embodiment may include a body 110 and first and second external electrodes 131 and 132.

The body 110 may include an active region 115 including a plurality of dielectric layers 111 stacked in a Z direction and a plurality of first and second internal electrodes 121 and 122 alternately disposed in the Z direction with each of the dielectric layers 111 interposed therebetween, and covers 112 and 113 disposed on upper and lower surfaces of the active region 115.

The body 110 may be formed by stacking the plurality of dielectric layers 111 and the first and second internal electrodes 121 and 122 in the Z direction and sintering the stacked dielectric layers and first and second internal electrodes, and a shape of the body 110 is not particularly limited, but may have a substantially hexahedral shape as illustrated.

Here, the body 110 may have first and second surfaces 1 and 2 opposing each other in the Z direction, third and fourth surfaces 3 and 4 connecting the first and second surfaces 1 and 2 to each other and opposing in an X direction, and fifth and sixth surfaces 5 and 6 connecting the first and second surfaces 1 and 2 to each other and the third and fourth surfaces 3 and 4 to each other and opposing each other in a Y direction.

The dielectric layers 111 may be in a sintered state, and adjacent dielectric layers 111 may be integrated with each other so that boundaries therebetween are not readily apparent without a scanning electron microscope (SEM).

In this case, a thickness of the dielectric layer 111 may be suitably changed according to a capacitance design of the multilayer ceramic capacitor 100.

Further, the dielectric layer 111 may contain ceramic powder having high permittivity, for example, barium titanate ($BaTiO_3$) based powder, strontium titanate ($SrTiO_3$) based powder, magnesiumtitanate, or the like, but the material of the dielectric layer 111 is not limited thereto as long as sufficient capacitance may be obtained.

In addition, if necessary, at least one of a ceramic additive, an organic solvent, a plasticizer, a binder, a dispersant, and the like, may be further added to the dielectric layer 111 together with the ceramic powder.

Further, in the present exemplary embodiment, the dielectric layer 111 may have a thickness of 0.2 μm or more after sintering. When the thickness of the dielectric layer 111 is less than 0.2 μm, the number of grains existing in one layer is excessively small, which may have a negative influence on reliability.

The covers 112 and 113 may be disposed on both outermost portions of the body 110 in the Z direction as margins in the Z direction.

The covers 112 and 113 may have the same material and configuration as those of the dielectric layer 111 except that internal electrodes are not included therein.

Further, the covers 112 and 113 may be formed by stacking one or two or more dielectric layers on both outermost portions of the body 110 in the Z direction, respectively, and may basically serve to prevent the first and second internal electrodes 121 and 122 from being damaged by physical or chemical stress.

The first and second internal electrodes 121 and 122, which are electrodes applied with different polarities, may be alternately disposed in the body 110 with each of the dielectric layers 111 interposed therebetween in the Z direction.

One end portions of the first and second internal electrodes 121 and 122 may be exposed to the third and fourth surfaces 3 and 4 of the body 110, respectively.

Here, the first and second internal electrodes 121 and 122 may be electrically insulated from each other by the dielectric layer 111 disposed therebetween.

Further, a conductive material contained in the first and second internal electrodes 121 and 122 is not particularly limited, but a base metal may be used since a material constituting the dielectric layer 111 needs to have reduction resistance.

As the base metal, nickel (Ni) or a Ni alloy may be used, wherein as the Ni alloy, an alloy of Ni and one or more elements selected from Mn, Cr, Co, Sn, and Al.

The first and second external electrodes 131 and 132 may be formed of a conductive paste containing a conductive metal.

Here, the conductive metal may be, for example, nickel (Ni), copper (Cu), palladium (Pd), gold (Au) or an alloy thereof. However, the conductive metal is not limited thereto.

The first and second external electrodes 131 and 132 as described above may include first and second connection portions 131a and 132a and first and second band portions 131b and 132b, respectively.

In the first and second external electrodes 131 and 132, the first and second connection portions 131a and 132a may be portions disposed on both surfaces of the body 110 in the X direction, respectively, and the first and second band portions 131b and 132b may be portions extended from the first and second connection portions 131a and 132a to portions of a lower surface of the body 110, a mounting surface of the body 110, respectively.

Here, the first and second band portions 131b and 132b may be further extended up to portions of at least one surface of an upper surface of the body 110 and both surfaces of the body 110 in the Y direction. Therefore, adhesion strength of the first and second external electrodes 131 and 132 may be improved.

In addition, although a case in which the first and second band portions 131b and 132b of the first and second external electrodes 131 and 132 are all extended from the first and second connection portions 131a and 132a to portions of the upper surface of the body 110 and both surfaces thereof in the Y direction to cover both end portions of the body 110 is described and illustrated in the present exemplary embodiment, the first and second band portions 131b and 132b are not necessarily limited thereto.

The first and second external electrodes 131 and 132 as described above may be formed on both end portions of the body 110 and electrically connected to exposed end surfaces of the first and second internal electrodes 121 and 122 that are alternately disposed, thereby configuring a capacitor circuit.

A conductive material contained in the first and second external electrodes 131 and 132 as described above is not particularly limited, but nickel (Ni), copper (Cu), or an alloy thereof may be used.

The dielectric layer 111 constituting the body 110 of the multilayer ceramic capacitor as described above may contain a dielectric composition having reduction resistance.

The dielectric composition may contain a base material powder containing $Ba_mTiO_3$ (0.995≤m≤1.010); a first accessory ingredient containing at least one element corresponding to a transition metal in Group 5 of the periodic table, solid-dissolved at a Ti-site in $BaTiO_3$, and having an ionic radius smaller than that of $Ti^{4+}$ having a coordinate number of 6 when a coordinate number of the element is 6 in a total content of 0.3 to 1.2 moles, based on 100 moles of the base material powder; a second accessory ingredient containing ions or oxides of Si in a content of 0.6 to 4.5 moles, based on 100 moles of the base material powder; a third accessory ingredient containing at least one element in Period 4 or higher; and a fourth accessory ingredient containing at least one element in Period 3, wherein $0.70 \times B \leq C+D \leq 1.50 \times B$ (Correlation Equation 1) and $0.20 \leq D/(C+D) \leq 0.80$ (Correlation Equation 2) in which B is a total content of the second accessory ingredient, C is a total content of the third accessory ingredient, and D is a total content of the fourth accessory ingredient.

The dielectric composition may use elements capable of being solid-dissolved at the Ti-site in $BaTiO_3$ as penta-valent elements and having an ionic radius smaller than that of $Ti^{4+}$ when the coordinate number of the element is 6, thereby making it possible to more effectively prevent reliability from being deteriorated and to improve TCC characteristics as compared to an existing dielectric composition.

Hereinafter, each ingredient of the dielectric composition according to the exemplary embodiment of the present disclosure will be described in detail.

a) Base Material Powder

As the base material powder corresponding to a main ingredient of a dielectric material, $Ba_mTiO_3$ (0.995≤m≤1.010) based dielectric powder may be used.

Here, when m is less than 0.995, the base material powder may be easily reduced in the sintering under a reduction atmosphere to thereby be easily changed to a semi-conducting material, and it may be difficult to control grain growth, and when m is more than 1.010, a sintering temperature is excessively increased.

b) First Accessory Ingredient

The first accessory ingredient may contain at least one of the elements corresponding to the transition metal in Group 5 of the periodic table, solid-dissolved at a Ti-site in $BaTiO_3$, and having an ionic radius smaller than that of $Ti^{4+}$ having a coordinate number of 6 when the coordinate number of the element is 6 in a total content of 0.3 to 1.2 moles, based on 100 moles of the base material powder.

When the content of the first accessory ingredient added per 100 moles of the base material powder is less than 0.3 moles, reduction resistance and an effect of improving TCC characteristics may be deteriorated, and when the content is more than 1.2 moles, a room-temperature IR may be rapidly decreased, and the sintering temperature may be increased.

Here, the first accessory ingredient may contain one of ions, oxides, carbides, and hydrates of at least one selected from the group consisting of V, Nb, and Ta.

The first accessory ingredient may be solid-dissolved at the Ti-site to serve as a donor in the dielectric material, thereby serving to suppress generation of oxygen vacancy and to allow the dielectric material to have a more excellent TCC behavior.

c) Second Accessory Ingredient

The second accessory ingredient may contain one of ions, oxides, carbides, and hydrates of Si in a content of 0.6 to 4.5 moles, based on 100 moles of the base material powder.

When the content of the added second accessory ingredient is less than 0.6 moles, the sintering temperature may be increased, and a dissipation factor (DF) may be high, and when the content is more than 4.5 moles, permittivity may be decreased, and reliability may be decreased again.

The second accessory ingredient as described above may serve as sintering aids together with other added elements to promote sintering, and serve to further decrease the sintering temperature in a case of satisfying Correlation Equations 1 and 2 to be described below depending on contents of the third and fourth accessory ingredients.

d) Third Accessory Ingredient

The third accessory ingredient may contain at least one of the elements in Period 4 or higher of the periodic table. The third accessory ingredient may contain a Group 2 element.

Here, the third accessory ingredient may contain at least one of ions, oxides, carbides, and hydrates of at least one selected from the group consisting of Ca, Sr, and Ba.

The third accessory ingredient may serve to assist the first accessory ingredient in forming a B-site and to decrease the sintering temperature together with the second accessory ingredient, thereby promoting the sintering.

e) Fourth Accessory Ingredient

The fourth accessory ingredient may contain at least one of the elements in Period 3 of the periodic table. The fourth accessory ingredient may contain at least one Group 2 element having a lower atomic number than the at least one Group 2 element contained in the third accessory ingredient.

Here, the fourth accessory ingredient may contain one of ions, oxides, carbides, and hydrates of Mg. A form of the Mg oxide is not particularly limited. For example, MgO, $MgCO_3$, and the like, may be used.

The fourth accessory ingredient may serve to decrease the sintering temperature together with the second and third accessory ingredients.

In the present exemplary embodiment, when the total content of the second accessory ingredient is defined as B, the total content of the third accessory ingredient is defined as C, and the total content of the fourth accessory ingredient is defined as D, the following Correlation Equations 1 and 2 may be simultaneously satisfied.

$$0.70 \times B \leq C+D \leq 1.50 \times B \quad \text{Correlation Equation 1)}$$

$$0.20 \leq D/(C+D) \leq 0.80 \quad \text{Correlation Equation 2)}$$

The contents of the added third and fourth accessory ingredients may be changed depending on injection amounts of the first and second accessory ingredients. When C+D is less than 0.70×B moles in Correlation Equation 1, abnormal grain growth is caused, such that the sintering temperature and DF may be increased, and there is no effect of improving reliability. For example, in a case in which the content of the second accessory ingredient is 2.0 moles, when C+D is less than 0.70×B=1.4 moles, abnormal grain growth may be caused, such that the sintering temperature and DF may be increased, and there is no effect of improving reliability.

Further, when C+D is more than 1.50×B moles, permittivity may be decreased, and the sintering temperature may be increased.

In addition, when D/(C+D) is less than 0.20 or more than 0.80 in Correlation 2, a sintering window may become narrow.

f) Fifth Accessory Ingredient

A fifth accessory ingredient is not an element necessarily required in the present exemplary embodiment, but may be selectively contained in the composition according to the present exemplary embodiment as needed.

The fifth accessory ingredient as described above may impart reduction resistance and reliability to suppress generation of electrons capable of occurring under a reduction atmosphere.

Here, as the fifth accessory ingredient, one of ions, oxides, carbides, and hydrates of at least one selected from the group consisting of Mn, Cr, Fe, Mo, and Co corresponding to transition metals of the periodic table may be contained in a content of 0.1 to 1.0 mole based on 100 moles of the base material powder.

When the content of the fifth accessory ingredient is less than 0.1 moles, IR may be decreased, and reliability may be deteriorated, and when the content is more than 1.0 mole, permittivity may be decreased, and the sintering temperature may be increased similarly to other elements.

g) Sixth Accessory Ingredient

A sixth accessory ingredient is not an element necessarily required in the present exemplary embodiment, but may be selectively contained in the composition according to the present exemplary embodiment as needed.

The sixth accessory ingredient may serve to impart reduction resistance and suppress generation and movement of oxygen vacancy together with the first accessory ingredient.

Here, as the sixth accessory ingredient, one of ions, oxides, carbides, and hydrates of at least one selected from the group consisting of Y, Sm, Eu, Dy, Ho, Er, and Yb corresponding to rare earth elements may be contained in a content of 0.2 to 4.0 moles, based on 100 moles of the base material powder.

When the content of the sixth accessory ingredient is less than 0.2 moles, it may be difficult to implement reliability at a desired level, and when the content is more than 4.0 moles, permittivity may be decreased, and the sintering temperature may be increased.

h) Additional Accessory Ingredient

Meanwhile, if necessary, the dielectric composition according to the present disclosure may further contain an oxide of at least one of Li, K, B, and Al in a content of 0.1 to 0.5 moles in order to obtain an effect of decreasing the sintering temperature, or the like.

Here, the oxide of at least one of Li, K, B, and Al may be prepared together with the fifth accessory ingredient in a form of glass in advance to thereby be added.

Ingredients of the body of the electronic component according to the present exemplary embodiment may be confirmed after sintering by the following method.

First, in order to analyze ingredients of the multilayer ceramic capacitor, after removing the external electrodes and the plating layers of the multilayer ceramic capacitor, a test sample may be ground to thereby be prepared in a form of powder.

Next, a suitable amount of the test sample may be weighed using a scale. Here, the weight does not exceed at most 0.1 g (100 mg).

Next, the weighed test sample may be moved in a Teflon container, and then, a predetermined amount of an acid may be taken and added thereto on a hot plate.

Then, the kind of acid (nitric acid, hydrochloric acid, or hydrofluoric acid) and a ratio thereof may be differently used depending on a composition and a form of the test sample, and at the time of heat treatment, a heating temperature does not exceed 120° C.

Next, the test sample decomposed by the acid may be diluted with pure water and subjected to inductively coupled plasma (ICP) analysis. Here, as an ICP device, A Perkinelmer NexION 300 may be used.

Next, based on contents of Ba and Ti, addition contents (at %) of the other additives may be calculated from the analyzed ingredients.

Ingredients and contents of additional additives of a multilayer ceramic capacitor using $BaTiO_3$ used in the multilayer ceramic capacitor as a base material may be inspected. Further, relative contents may be analyzed by electron probe X-ray microanalysis (EPMA), energy dispersive spectrometry (EDS), and the like.

Hereinafter, the present disclosure will be described in detail through Inventive Examples and Comparative Examples, but these Examples are to help the specific understanding of the present disclosure. Therefore, the scope of the present disclosure is not limited thereto.

Inventive Example

After a composition containing ingredients illustrated in the following Table 1 was mixed with a dispersant using ethanol and toluene as solvents, a binder was mixed with the mixture, thereby manufacturing a ceramic sheet.

After a Ni electrode was printed on the formed ceramic sheet, the ceramic sheets on which the Ni electrode was printed were stacked, compressed, cut, and calcined in order to remove the binder, followed by sintering at 1,100 to 1,220° C. by an interval of 10° C. under reduction atmosphere. Then, a dielectric constant, a TCC value at 85° C./125° C., a high-temperature accelerated lifetime, and the like, of the resultant were evaluated.

A composition evaluation method will be described in more detail. Raw material powders were mixed with ethanol, toluene, the dispersant, and the binder using zirconia balls as mixing/dispersing media, ball-milled for 20 hours, and then dispersed three times at 22,000 psi using a high-temperature dispersion device and a dispersion chamber (100 μm).

Next, a ceramic sheet having a thickness of 4.0 μm, to be used as an active sheet and a ceramic sheet having a 10 to 13 μm, to be used as a cover sheet were formed using the prepared slurry and a doctor blade type coater. In addition, an internal electrode was printed on the ceramic sheet formed at a thickness of 4.0 μm using nickel.

Next, 25 layers of the cover sheets having a thickness of 10 to 13 μm were stacked, 30 layers of the active sheets on which the internal electrode was printed were stacked, and then, 25 layers of the cover sheets were stacked again, followed by performing ISO-PRESS at 85° C. for 1 hour, thereby manufacturing a bar.

In addition, the bar was cut into laminates having a size of 3.2×1.6 mm (length×width) using a cutter, and the cut laminated was calcined to remove the binder, followed by sintering at 1,100 to 1,220° C. for about 2 hours under a reduction atmosphere (1% $H_2$), thereby forming a body.

Next, external electrodes were formed on the body by termination and kept for 24 hours, thereby manufacturing a multilayer ceramic capacitor. Then, electrical characteristics thereof were measured.

[Evaluation]

Here, characteristics illustrated in Tables 1 and 2 are temperatures at which the multilayer ceramic capacitors had the highest BDV value at the time of measuring BDV of the multilayer ceramic capacitors per each sintering temperature, and temperatures at which the smallest amount of pores are observed in dielectric layers between electrodes at the time of observing a fracture surface at a magnification of 30,000× using field emission scanning electron microscope (FE-SEM).

Further, room-temperature capacitance and a dissipation factor (DF) of the multilayer ceramic capacitor were measured using an LCR meter under the conditions of 1 kHz and 1 V.

Further, temperature coefficient of capacitance (TCC) was measured using the LCR meter in a temperature range of −55 to 125° C. under the conditions of 1 kHz and 1 V.

In a high-temperature IR boosting test for measuring a high-temperature accelerated lifetime, a lifetime was evaluated depending on the presence or absence of an IR failure in 40 samples while increasing a voltage step by a multiple after maintaining the samples at 150° C. for 30 minutes under the condition of 1Vr=10V/μm.

The following Tables 1 and 2 illustrate characteristics of dielectric compositions and proto-type multilayer ceramic capacitors manufactured using the dielectric compositions. Here, α and β are values of Correlation Equations 1 and 2 when a total content of a second accessory ingredient was defined as B, a total content of a third accessory ingredient was defined as C, and a total content of a fourth accessory ingredient was defined as D, wherein α=(C+D)/B and β=D/(C+D).

TABLE 1

| | | | | Content (moles) per 100 moles of Base Material Powder | | | | | | | | | |
|---|---|---|---|---|---|---|---|---|---|---|---|---|---|
| Classification | m | First Accessory Ingredient | | Second Accessory Ingredient (B Ingredient) | Third Accessory Ingredient (C Ingredient) | | | Fourth Accessory Ingredient (D Ingredient) | Fifth Accessory Ingredient (Sum) | | Sixth Accessory Ingredient (Sum) | | Additional Accessory Ingredients |
| spec. | min | 0.995 | | 0.3 | 0.6 | | | — | — | 0.1 | | 0.2 | | — |
| | Max | 1.010 | | 1.2 | 3.5 | | | — | — | 1.0 | | 4.0 | | — |
| Classification | m | V | Nb | Si | Ba | Ca | Sr | Mg | Mn | Cr | Mo | Dy | Ho | Y | — |
| 1 | 0.998 | 0.30 | | 1.00 | 0.70 | | | 0.20 | 0.20 | 0.10 | | 0.80 | | | |
| 2 | 0.998 | | 0.40 | 2.50 | 1.00 | 0.56 | | 1.56 | 0.25 | 0.05 | | 1.50 | | | |
| 3 | 0.998 | 0.80 | | 2.50 | 1.70 | | | 1.43 | 0.10 | 0.05 | | 1.00 | | | |
| 4 | 0.998 | 1.20 | | 2.00 | 1.40 | 0.30 | 0.31 | 0.94 | 0.75 | 0.05 | | 0.80 | | | |
| *5 | 0.995 | 0.20 | | 2.00 | 1.90 | | | 0.88 | 0.20 | | | 0.80 | | | |
| 6 | 0.995 | 0.30 | | 2.00 | 1.90 | | | 0.88 | 0.05 | 0.15 | | 0.80 | | | |
| 7 | 0.995 | 0.75 | | 2.00 | 1.90 | | | 0.88 | 0.05 | 0.15 | | 0.80 | | | |
| *8 | 0.995 | 1.40 | | 2.00 | 1.90 | | | 0.88 | 0.10 | | | 0.80 | | | |
| *9 | 1.010 | 0.10 | | 2.00 | 1.00 | | | 1.80 | 0.10 | | | 1.50 | | | |
| 10 | 1.010 | 0.30 | 0.10 | 2.00 | 1.00 | | | 1.80 | 0.10 | 0.10 | | 1.50 | | | |
| 11 | 1.010 | 0.65 | 0.10 | 2.00 | 1.00 | | | 1.80 | 0.10 | 0.10 | | 1.50 | | | |
| *12 | 1.010 | 1.30 | 0.10 | 2.00 | 1.00 | | | 1.80 | 0.10 | | 0.10 | 1.50 | | | |
| *13 | 0.985 | 0.30 | | 1.00 | 0.70 | | | 0.20 | 0.20 | | | 0.80 | | | |
| *14 | 1.020 | 0.30 | | 1.00 | 0.70 | | | 0.20 | 0.20 | | | 0.80 | | | |
| *15 | 0.998 | 0.50 | | 0.20 | 0.15 | | | 0.10 | 0.20 | | | 0.30 | 0.20 | | |
| 16 | 0.998 | 0.50 | | 0.60 | 0.45 | | | 0.30 | 0.20 | | | 0.30 | 0.20 | | |
| 17 | 0.998 | 0.50 | | 4.00 | 3.00 | | | 2.00 | 0.20 | | | 0.30 | 0.20 | | |
| *18 | 0.998 | 0.50 | | 6.50 | 4.88 | | | 3.25 | 0.20 | | | 0.30 | 0.20 | | |
| *19 | 1.005 | 0.40 | | 1.80 | 0.40 | | | 0.70 | 0.20 | | | 0.80 | | | |
| 20 | 1.005 | 0.40 | | 1.80 | 0.45 | | | 0.81 | 0.20 | | | 0.80 | | | |
| 21 | 1.005 | 0.40 | | 1.80 | 0.97 | | | 1.73 | 0.20 | | | 0.80 | | | |
| *22 | 1.005 | 0.40 | | 1.80 | 1.24 | | | 2.21 | 0.10 | | | 0.80 | | | |
| *23 | 1.010 | 0.55 | | 2.50 | 0.31 | | | 2.81 | 0.10 | 0.10 | | 2.00 | | | |
| 24 | 1.010 | 0.55 | | 2.50 | 0.63 | | | 2.50 | 0.10 | 0.10 | | 2.00 | | | |
| 25 | 1.010 | 0.55 | | 2.50 | 2.50 | | | 0.63 | 0.10 | 0.10 | | 2.00 | | | |
| *26 | 1.010 | 0.55 | | 2.50 | 2.81 | | | 0.31 | 0.10 | 0.10 | | 2.00 | | | |
| *27 | 0.998 | 0.60 | | 1.30 | 1.17 | | | 0.78 | 0.01 | | | | 1.00 | | |
| 28 | 0.998 | 0.60 | | 1.30 | 1.17 | | | 0.78 | 0.10 | | | | 1.00 | | |
| 29 | 0.998 | 0.60 | | 1.30 | 1.00 | 0.17 | | 0.78 | 1.00 | | | | 1.00 | | |
| *30 | 0.998 | 0.60 | | 1.30 | 1.00 | 0.17 | | 0.78 | 1.50 | | | | 1.00 | | |
| *31 | 1.010 | 0.35 | | 1.80 | 0.97 | | | 1.73 | 0.20 | | | 0.10 | | | |
| 32 | 1.010 | 0.35 | | 1.80 | 0.97 | | | 1.73 | 0.20 | | | 0.20 | | | |
| 33 | 1.010 | 0.35 | | 1.80 | 0.97 | | | 1.73 | 0.20 | | | 4.00 | | | |
| *34 | 1.010 | 0.35 | | 1.80 | 0.97 | | | 1.73 | 0.20 | 0.10 | | 6.00 | | | |
| 35 | 0.998 | 0.20 | 0.35 | 2.20 | 1.80 | | | 1.00 | 0.20 | 0.10 | | 1.10 | 0.10 | | 0.5Al |
| 36 | 0.998 | 0.80 | | 2.20 | 1.80 | | | 1.00 | 0.20 | | | 1.50 | 0.10 | | 0.2B0.2Li |

TABLE 2

| | Correlation Equation Value | | Characteristic Evaluation Value | | | High-Temperature |
|---|---|---|---|---|---|---|
| Classification | α (C + D)/B | β D/(C + D) | Dielectric Constant | DF | 125° C. TCC | Accelerated Lifetime |
| Spec. min | 0.7 | 0.2 | 1000 | | | 3Vr |
| Spec. Max | 1.5 | 0.8 | — | 15% | −15% | |
| 1 | 0.90 | 0.22 | 3300 | 8.5% | −14% | 7Vr |
| 2 | 1.25 | 0.50 | 2300 | 2.9% | −1% | 9Vr |
| 3 | 1.25 | 0.46 | 2600 | 3.5% | −6% | 11Vr |
| 4 | 1.48 | 0.32 | 2400 | 3.4% | −3% | 13Vr |
| *5 | 1.39 | 0.32 | 2800 | 3.8% | −22% | 5Vr |
| 6 | 1.39 | 0.32 | 2700 | 3.5% | −14% | 8Vr |
| 7 | 1.39 | 0.32 | 2500 | 3.3% | −10% | 10Vr |
| *8 | 1.39 | 0.32 | 2200 | 2.8% | −3% | 1Vr |
| *9 | 1.40 | 0.64 | 2800 | 2.9% | −18% | 3Vr |
| 10 | 1.40 | 0.64 | 2700 | 3.0% | −5% | 4Vr |
| 11 | 1.40 | 0.64 | 2300 | 3.3% | −4% | 6Vr |
| *12 | 1.40 | 0.64 | 2300 | 3.0% | 2% | 1Vr |
| *13 | 0.90 | 0.22 | 3800 | 6.5% | −19% | 4Vr |
| *14 | 0.90 | 0.22 | 3300 | 4.5% | −14% | 2Vr |
| *15 | 1.25 | 0.40 | 5800 | 9.6% | −38% | 1Vr |
| 16 | 1.25 | 0.40 | 4200 | 4.9% | −15% | 4Vr |
| 17 | 1.25 | 0.40 | 2900 | 3.8% | −7% | 6Vr |
| *18 | 1.25 | 0.40 | 2600 | 2.8% | 2% | 2Vr |
| *19 | 0.61 | 0.64 | 2500 | 3.2% | −3% | 1Vr |
| 20 | 0.70 | 0.64 | 2600 | 3.0% | −6% | 7Vr |
| 21 | 1.50 | 0.64 | 2500 | 2.5% | −8% | 11Vr |
| *22 | 1.92 | 0.64 | 2000 | 2.2% | 2% | 2Vr |
| *23 | 1.25 | 0.90 | 2700 | 4.0% | −18% | 3Vr |
| 24 | 1.25 | 0.80 | 2600 | 3.8% | −14% | 8Vr |
| 25 | 1.25 | 0.20 | 2400 | 3.4% | −2% | 10Vr |
| *26 | 1.25 | 0.10 | 2100 | 2.8% | 0% | 1Vr |
| *27 | 1.50 | 0.40 | 3500 | 5.0% | −16% | 1Vr |
| 28 | 1.50 | 0.40 | 3300 | 4.8% | −13% | 5Vr |
| 29 | 1.50 | 0.40 | 2700 | 2.4% | −10% | 4Vr |
| *30 | 1.50 | 0.40 | 2500 | 2.0% | −12% | 2Vr |
| *31 | 1.50 | 0.64 | 4200 | 6.2% | −32% | 1Vr |
| 32 | 1.50 | 0.64 | 3300 | 4.9% | −15% | 8Vr |
| 33 | 1.50 | 0.64 | 2100 | 2.5% | −12% | 6Vr |
| *34 | 1.50 | 0.64 | 1800 | 1.9% | −8% | 2Vr |
| 35 | 1.27 | 0.36 | 3100 | 5.1% | −8% | 10Vr |
| 36 | 1.27 | 0.36 | 2600 | 3.8% | −4% | 10Vr |

Referring to Tables 1 and 2, in sample 5 in which V was contained as a first accessory ingredient, but a content thereof was 0.2 moles, which was less than a reference value, a TCC was −22%, which deviated from a reference value.

In sample 8 in which a content of V corresponding to the first accessory ingredient was 1.40 moles, which was more than a reference value, a high-temperature accelerated lifetime was 1 Vr, which was less than a reference value.

In sample 9 in which a content of V corresponding to a first accessory ingredient was 0.10 moles, which was less than a reference value, a TCC was −18%, which deviated from a reference value.

In sample 12 in which a content of V corresponding to a first accessory ingredient was 1.30 moles, which was more than a reference value, and a content of Nb was 0.10 moles, a high-temperature accelerated lifetime was 1 Vr, which was less than a reference value.

In sample 13 in which m of a base material powder was less than a reference value, TCC was −19%, which deviated from a reference value.

In sample 14 in which m of a base material powder was more than a reference value, a high-temperature accelerated lifetime was 2 Vr, which was less than a reference value.

In sample 15 in which a content of Si corresponding to a second accessory ingredient was 0.20 moles, which was less than a reference value, a TCC was −38%, which deviated from a reference value, and a high-temperature accelerated lifetime was 1 Vr, which was less than a reference value.

In sample 18 in which a content of Si corresponding to the second accessory ingredient was 6.50 moles, which was more than a reference value, a high-temperature accelerated lifetime was 2 Vr, which was less than a reference value.

In sample 19 in which a content of Si corresponding to a second accessory ingredient was 1.80 moles, a content of Ba corresponding to a third accessory ingredient was 0.40 moles, a content of Mg corresponding to a fourth accessory ingredient was 0.70 moles, and an a value was 0.61, which was less than reference value, and a high-temperature accelerated lifetime was 1 Vr, which was less than a reference value.

In sample 22 in which a content of Si corresponding to a second accessory ingredient was 1.80 moles, a content of Ba corresponding to a third accessory ingredient was 1.24 moles, a content of Mg corresponding to a fourth accessory ingredient was 2.21 moles, and an a value was 1.92, which was more than reference value, and a high-temperature accelerated lifetime was 2 Vr, which was less than a reference value.

In sample 23 in which a content of Si corresponding to a second accessory ingredient was 2.50 moles, a content of Ba corresponding to a third accessory ingredient was 0.31 moles, a content of Mg corresponding to a fourth accessory ingredient was 2.81 moles, and a β value was 0.90, which was more than reference value, and a TCC was −18%, which deviated from a reference value.

In sample 26 in which a content of Si corresponding to a second accessory ingredient was 2.50 moles, a content of Ba corresponding to a third accessory ingredient was 2.81 moles, a content of Mg corresponding to a fourth accessory ingredient was 0.31 moles, and a β value was 0.10, which is less than reference value, a high-temperature accelerated lifetime was 1 Vr, which was less than a reference value.

In sample 27 in which a content of Mn corresponding to a fifth accessory ingredient was 0.01 moles, which was less than a reference value, a high-temperature accelerated lifetime was 1 Vr, which was less than a reference value.

In sample 30 in which a content of Mn corresponding to a fifth accessory ingredient was 1.50 moles, which was more than a reference value, a high-temperature accelerated lifetime was 2 Vr, which was less than a reference value.

In sample 31 in which a content of Dy corresponding to a sixth accessory ingredient was 0.10 moles, which was less than a reference value, a TCC was −32%, which deviated from a reference value, and a high-temperature accelerated lifetime was 1 Vr, which was less than a reference value.

In sample 34 in which a content of Dy corresponding to a sixth accessory ingredient was 6.00 moles, which was more than a reference value, a high-temperature accelerated lifetime was 2 Vr, which was less than a reference value.

Therefore, referring to Tables 1 and 2, it may be confirmed that when the content of the first accessory ingredient was less than 0.3 moles, reduction resistance and an effect of improving the TCC characteristics may be deteriorated, and when the content of the first accessory ingredient was more than 1.2 moles, room-temperature IR was rapidly decreased, and a sintering temperature was increased.

Further, it may be confirmed that when the content of the added second accessory ingredient was less than 0.6 moles, the sintering temperature was increased, and a dissipation factor (DF) was high, and when the content was more than 4.5 moles, permittivity was decreased, and reliability was decreased again.

In addition, the contents of the added third and fourth accessory ingredients are changed depending on injection amounts of the first and second accessory ingredients. It may be confirmed that when the value of Correlation Equation 1 was less than 0.70×B moles, abnormal grain growth was caused, such that the sintering temperature and DF were increased, and there was no effect of improving reliability, and the value of Correlation Equation 1 was more than 1.50×B moles, permittivity was decreased, and the sintering temperature increased. Further, when the value of Correlation Equation 2 was less than 0.2 or more than 0.8, a sintering window tended to become narrow.

When the content of the fifth accessory ingredient is less than 0.1 moles, IR may be decreased, and reliability may be deteriorated, and when the content is more than 1.0 mole, permittivity may be decreased, and the sintering temperature may be increased similarly to other elements.

Further, it may be confirmed that when the content of the sixth accessory ingredient was less than 0.2 moles, it was difficult to implement reliability at a desired level, and when the content was more than 4.0 moles, permittivity was decreased, and the sintering temperature was increased.

Meanwhile, it may be confirmed that in a case of additionally using an accessory ingredient such as oxides of Li, K, B, Al, or the like, in a content of 0.1 to 0.5 moles for an effect of decreasing a sintering temperature, or the like, the sintering temperature was decreased, and in a case of using a glass compound of Li—K—B—Ba—Si, the sintering temperature was also decreased.

Therefore, in a case of preparing a dielectric composition so as to satisfy the exemplary embodiment in the present disclosure, high-temperature reliability and TCC characteristics of an electronic component may be improved.

As set forth above, according to exemplary embodiments in the present disclosure, the dielectric composition may be used as a composition of an electronic component having various temperature characteristics such as X5R, X6S, X7R (S), and the like, requiring high reliability, such that at the time of applying the dielectric composition to the electronic component, high-temperature reliability and TCC characteristics of the electronic component may be improved.

While exemplary embodiments have been shown and described above, it will be apparent to those skilled in the art that modifications and variations could be made without departing from the scope of the present invention as defined by the appended claims.

What is claimed is:
1. A dielectric composition comprising:
   a base material powder containing $Ba_mTiO_3$ ($0.995 \leq m \leq 1.010$);
   a first accessory ingredient containing at least one element corresponding to a transition metal in Group 5 of the periodic table in a total content of 0.3 to 1.2 moles, based on 100 moles of the base material powder;
   a second accessory ingredient containing at least one of ions, oxides, carbides, and hydrates of Si in a total content of 0.6 to 4.5 moles, based on 100 moles of the base material powder;
   a third accessory ingredient, distinct from the second accessory ingredient, containing at least one element in Period 4 or higher; and
   a fourth accessory ingredient containing at least one element in Period 3,
   wherein $0.70 \times B \leq C+D \leq 1.50 \times B$ and $0.20 \leq D/(C+D) \leq 0.80$, in which B is a total content of the second accessory ingredient, C is a total content of the third accessory ingredient, and D is a total content of the fourth accessory ingredient.

2. The dielectric composition of claim 1, wherein the first accessory ingredient contains at least one of ions, oxides, carbides, and hydrates of at least one selected from the group consisting of V, Nb, and Ta.

3. The dielectric composition of claim 1, wherein the third accessory ingredient contains at least one of ions, oxides, carbides, and hydrates of at least one selected from the group consisting of Ca, Sr, and Ba.

4. The dielectric composition of claim 1, wherein the fourth accessory ingredient contains Mg.

5. The dielectric composition of claim 1, further comprising a fifth accessory ingredient containing at least one of ions, oxides, carbides, and hydrates of at least one selected from the group consisting of Mn, Cr, Fe, Mo, and Co in a content of 0.1 to 1.0 mole based on 100 moles of the base material powder.

6. The dielectric composition of claim 1, further comprising a sixth accessory ingredient containing at least one of ions, oxides, carbides, and hydrates of at least one selected from the group consisting of Y, Sm, Eu, Dy, Ho, Er, and Yb in a content of 0.2 to 4.0 moles, based on 100 moles of the base material powder.

7. The dielectric composition of claim 1, further comprising an oxide of at least one of Li, K, B, and Al in a content of 0.1 to 0.5 moles, based on 100 moles of the base material powder.

8. The dielectric composition of claim 1, wherein the first accessory ingredient is solid-dissolved at a Ti-site in BaTiO$_3$, and has an ionic radius smaller than that of Ti$^{4+}$ having a coordinate number of 6 when a coordinate number of the element is 6.

9. An electronic component comprising:
a body including a plurality of dielectric layers and internal electrodes; and
external electrodes disposed on the body to be connected to the internal electrodes,
wherein the dielectric layer contains:
a base material powder containing Ba$_m$TiO$_3$ (0.995≤m≤1.010);
a first accessory ingredient containing at least one element corresponding to a transition metal in Group 5 of the periodic table in a total content of 0.3 to 1.2 moles, based on 100 moles of the base material powder;
a second accessory ingredient containing at least one of ions, oxides, carbides, and hydrates of Si in a content of 0.6 to 4.5 moles, based on 100 moles of the base material powder;
a third accessory ingredient, distinct from the second accessory ingredient, containing at least one element in Period 4 or higher; and
a fourth accessory ingredient containing at least one element in Period 3,
wherein 0.70×B≤C+D≤1.50×B and 0.20≤D/(C+D)≤0.80, in which B is a total content of the second accessory ingredient, C is a total content of the third accessory ingredient, and D is a total content of the fourth accessory ingredient.

10. The electronic component of claim 9, wherein the dielectric layer further contains a fifth accessory ingredient containing at least one of ions, oxides, carbides, and hydrates of at least one selected from the group consisting of Mn, Cr, Fe, and Co in a content of 0.1 to 1.0 mole, based on 100 moles of the base material powder.

11. The electronic component of claim 9, wherein the dielectric layer further contains a sixth accessory ingredient containing at least one of ions, oxides, carbides, and hydrates of at least one selected from the group consisting of Y, Sm, Eu, Dy, Ho, Er, and Yb in a content of 0.2 to 4.0 moles, based on 100 moles of the base material powder.

12. The electronic component of claim 9, wherein the dielectric layer further contains an oxide of at least one of Li, K, B, and Al in a content of 0.1 to 0.5 moles, based on 100 moles of the base material powder.

13. The electronic component of claim 9, wherein the dielectric layer has a thickness of 0.2 μm or more.

14. The electronic component of claim 9, wherein the first accessory ingredient is solid-dissolved at a Ti-site in BaTiO$_3$, and has an ionic radius smaller than that of Ti$^{4+}$ having a coordinate number of 6 when a coordinate number of the element is 6.

15. A dielectric composition comprising:
a base material powder containing Ba$_m$TiO$_3$ (0.995≤m≤1.010);
a first accessory ingredient containing at least one element corresponding to a transition metal in Group 5 of the periodic table in a total content of 0.3 to 1.2 moles, based on 100 moles of the base material powder;
a second accessory ingredient containing at least one of ions, oxides, carbides, and hydrates of Si in a content of 0.6 to 4.5 moles, based on 100 moles of the base material powder;
a third accessory ingredient, distinct from the second accessory ingredient, containing at least one Group 2 element; and
a fourth accessory ingredient containing at least one Group 2 element having a lower atomic number than the at least one Group 2 element contained in the third accessory ingredient,
wherein 0.70×B≤C+D≤1.50×B and 0.20≤D/(C+D)≤0.80, in which B is a total content of the second accessory ingredient, C is a total content of the third accessory ingredient, and D is a total content of the fourth accessory ingredient.

16. The dielectric composition of claim 15, wherein the first accessory ingredient contains at least one of ions, oxides, carbides, and hydrates of at least one selected from the group consisting of V, Nb, and Ta.

17. The dielectric composition of claim 15, wherein the third accessory ingredient contains at least one of ions, oxides, carbides, and hydrates of at least one selected from the group consisting of Ca, Sr, and Ba.

18. The dielectric composition of claim 15, wherein the fourth accessory ingredient contains Mg.

19. The dielectric composition of claim 15, further comprising a fifth accessory ingredient containing at least one of ions, oxides, carbides, and hydrates of at least one selected from the group consisting of Mn, Cr, Fe, Mo, and Co in a content of 0.1 to 1.0 mole based on 100 moles of the base material powder.

20. The dielectric composition of claim 15, further comprising a sixth accessory ingredient containing at least one of ions, oxides, carbides, and hydrates of at least one selected from the group consisting of Y, Sm, Eu, Dy, Ho, Er, and Yb in a content of 0.2 to 4.0 moles, based on 100 moles of the base material powder.

* * * * *